United States Patent
Krieger

[11] Patent Number: 6,140,798
[45] Date of Patent: Oct. 31, 2000

[54] DOCKING STATION FOR A PORTABLE ELECTRICAL POWER SOURCE

[75] Inventor: Michael Krieger, Miami Beach, Fla.

[73] Assignee: Vector Products, Inc., Ft. Lauderdale, Fla.

[21] Appl. No.: 09/372,031

[22] Filed: Aug. 11, 1999

[51] Int. Cl.[7] ........................................ H02J 7/00
[52] U.S. Cl. ................................ 320/109; 320/107
[58] Field of Search ........................ 320/109, 107, 320/104, 105, 103; 429/96–100

[56] References Cited

U.S. PATENT DOCUMENTS

| | | | |
|---|---|---|---|
| 5,607,794 | 3/1997 | Koening | 429/165 |
| 5,793,185 | 8/1998 | Prelec et al. | 320/105 |
| 5,982,138 | 11/1999 | Krieger | 320/104 |

Primary Examiner—Peter S. Wong
Assistant Examiner—Lawrence Luk
Attorney, Agent, or Firm—Venable; George H. Spencer; Robert Kinberg

[57] ABSTRACT

A docking station secures a portable electrical energy source to a vehicle having a DC power supply and charges a battery contained in the portable electrical energy source. The docking station includes a platform adaptive for receiving the portable electrical energy source. A first attaching mechanism removably fixes the portable electrical energy source to the platform. A second attaching mechanism fixes the platform to a structure of the vehicle. An electrical circuit has an input adapted for connection to the DC power supply of the vehicle and an output adapted for connection to the battery of the portable electrical energy source while the portable electrical energy source is fixed to the platform. A circuit is coupled between the input and output of the electrical circuit for controlling charging of the battery of the portable electrical energy source.

11 Claims, 5 Drawing Sheets

DOCKING STATION FOR A PORTABLE ELECTRICAL POWER SOURCE

BACKGROUND OF THE INVENTION

The invention relates to a docking station for the storage and electrical charging of a portable electrical energy source.

Portable electrical energy sources are known for providing direct current for jump starting vehicles as well as for energizing various appliances. In such jump start systems the power supply is often a 12-volt lead-acid battery. Periodically and after use the battery must be recharged from a suitable power source. Most jump start systems include an integral charging circuit and lead for plugging into either a DC or an AC source for charging the battery when required. A disadvantage of this configuration is that the jump starter may sit disconnected and idle in a vehicle or other stowage location till needed and thus be less than fully charged when needed in an emergency. Another disadvantage of this configuration is the susceptibility of lead acid batteries to damage by physical shock while loosely stowed in a moving vehicle.

SUMMARY OF THE INVENTION

It is an object of the invention to eliminate the foregoing disadvantages by providing a docking station that will provide both a secure stowage location within a vehicle and will maintain the battery of the jump start system at a high state of charge until needed.

The above and other objects are accomplished according to the invention by the provision of a platform for receiving the portable electrical energy source; an electrical charging circuit for connecting the battery of the portable electrical energy source to an external D.C. voltage source; and means for physically securing the portable electrical energy source to the platform.

According to various embodiments of the invention, the securing means may slidably receive a portion of the portable electrical power source and/or the securing means may comprise hold-down straps of various configurations and materials. Other mechanisms for removably securing the portable electrical power source to the platform will be apparent to those of skill in the art.

According to further embodiments of the invention, the electrical charging circuit may contain a circuit for sensing and indicating the level of charge maintained in the battery of the portable electrical power source.

DETAILED DESCRIPTION OF THE PREFERRED EMBODIMENT

Figure 1:
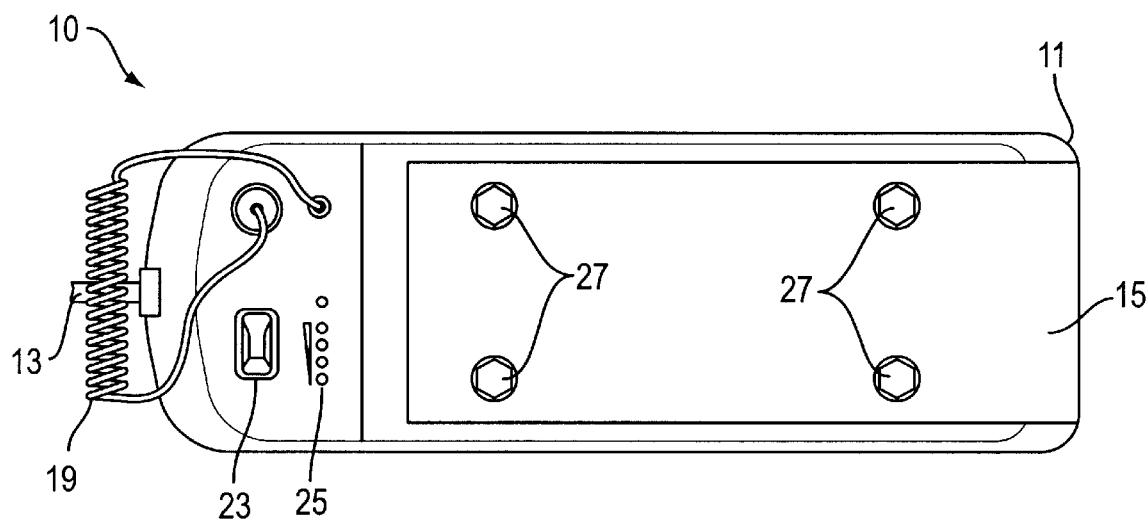
FIG. 1 is an overhead view of a docking station for a portable electric power source according to the invention.

Referring to FIG. 1, there is shown a docking station 10 which includes a molded plastic platform 11 formed with a longitudinal slot 15 shaped to slidably engage an interlocking structure on the exterior of a portable electrical power source. The overhead view of FIG. 1 additionally shows an electrical supply lead 13, an electrical charging lead 19, an electrical isolation switch 23, a display for indicating the state of charge of the portable electric power source battery (when stowed and charging) 25 and screws 27 for fixing the platform of the docking station to a location in a vehicle. Other methods for attaching platform 11 to the vehicle will be apparent to those skilled in the art.

Figure 2:
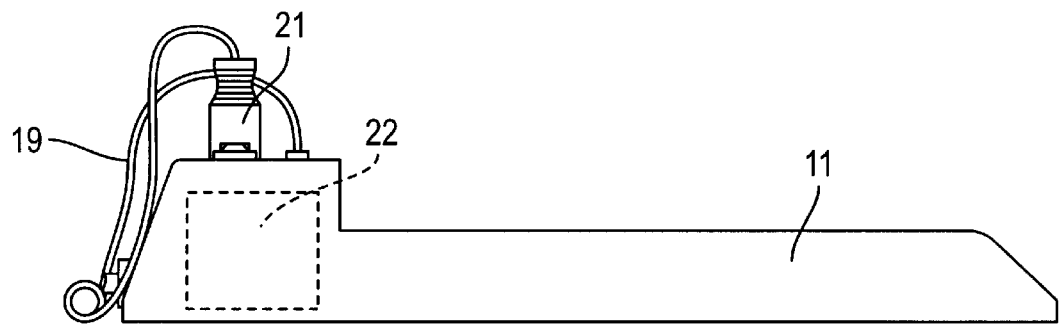
FIG. 2 is a front elevation view of the docking station for a portable electric power source shown in FIG. 1.

FIG. 2 shows a front elevation view of the docking station shown in FIG. 1. FIG. 2 further shows a male plug 21, for example a cigarette lighter type plug, for electrically connecting the portable electrical power source to a docking station charging circuit. Male plug 21 is shown in its stowed (not in use) position. Also shown is a possible location for an electrical charging and indicating circuit 22, which is internal to the molded plastic platform 11.

Figure 3:
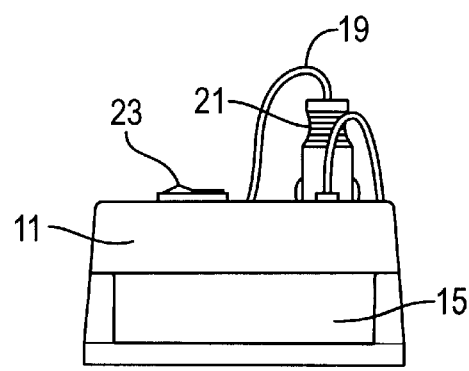
FIG. 3 is a right side elevation view of the docking station for a portable electric power source shown in FIG. 1.

FIG. 3 shows a side elevation view of the docking station 10 shown in FIG. 1 and provides an end-on view of the longitudinal slot 15 intended to slidably engage an interlocking structure on the exterior of a portable electrical power source.

Figure 4:
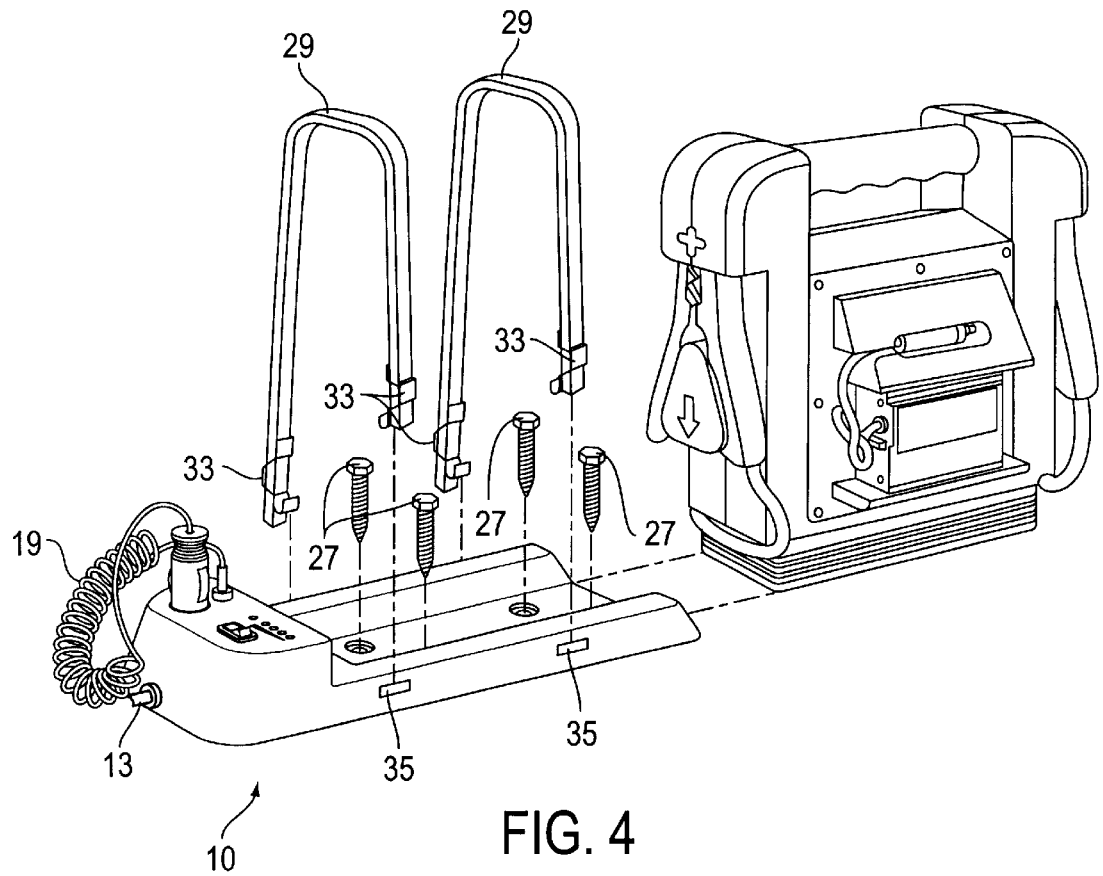
FIG. 4 is a perspective view exploded to show the docking station according to the invention and a portable electric power source it is intended to secure.
Figure 5:
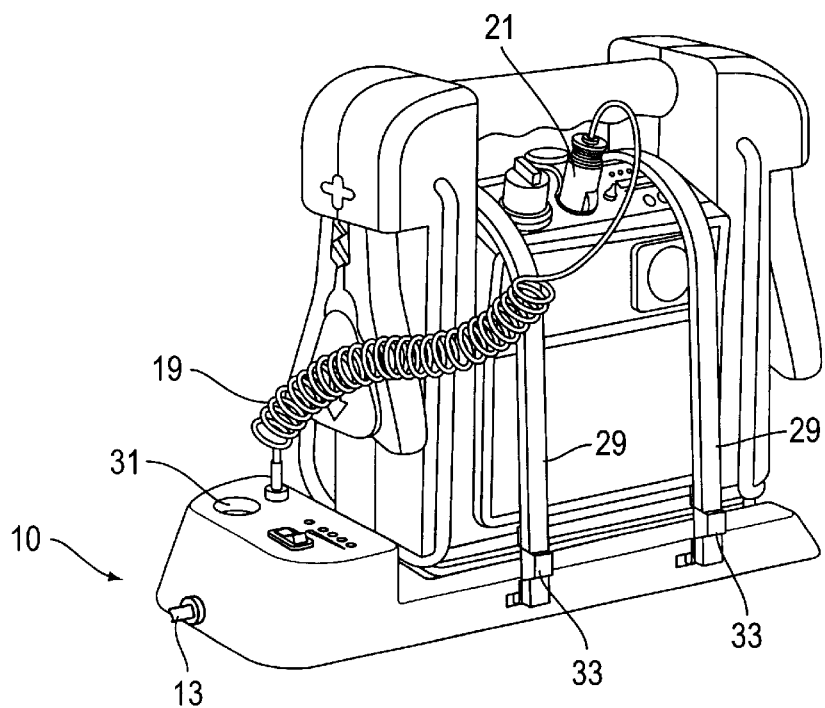
FIG. 5 is a perspective view of the docking station according to the invention containing a portable electric power source in the stored position and with the charging lead connected.

The principles of the invention may be implemented to provide storage and charging of any portable electrical power source, but it is particularly useful in connection with a portable jump start system for use in jump starting cars, trucks, boats and other vehicles. FIGS. 4 and 5 show such a combination. FIG. 4 shows an exploded perspective view of a typical portable jump start system in position for sliding into slot 15 in platform 11. FIG. 4 also shows additional attaching means in the form of two hold down straps 29 for further securing the portable electrical power source when in the docking station. In the embodiment shown in FIG. 4, the hold down straps 29 are of metallic, nylon or rubber construction with sufficient flexibility to be fit over the jump start system through the opening between the body and handle of the representative jump start system shown. The hold down straps 29 are tightened and secured over the jump start system by use of manually operated flexible metal or plastic type clips 33 that can slide over and frictionally grasp the hold down straps while mechanically hooking into slots 35 in platform 11. By means of the flexible metal clips 33 the tension on the hold down straps 29 may be adjusted or released. The jump start system shown in FIG. 4, and more fully disclosed in co-pending U.S. application Ser. No. 09/213,265, filed Dec. 17, 1998, now U.S. Pat. No. 5,982,138 (incorporated by reference), includes an enclosure containing a 12 volt lead-acid battery, jumper cables and clamps stored on opposite parallel faces of the enclosure. The jump start system enclosure is made of plastic and the base of the enclosure has been formed with a series of parallel lands and grooves designed to slidably engage with a corresponding and interlocking structure in the sides of longitudinal slot 15 in docking station platform 11.

FIG. 5 shows a perspective view of the docking station 10 with a jump start system secured in place. Other mechanisms for securing such a portable electrical power supply in docking station platform 11 will be apparent to those skilled in the art. FIG. 5 also shows the electrical charging lead 19 in use with the male charging plug 21 removed from its holder 31 and inserted into a charging receptacle on the jump start system. In another embodiment of the invention, holder 31 can also house a DC power receptacle which can serve as an auxilliary source of 12 volt DC power from the vehicle.

Figure 6:
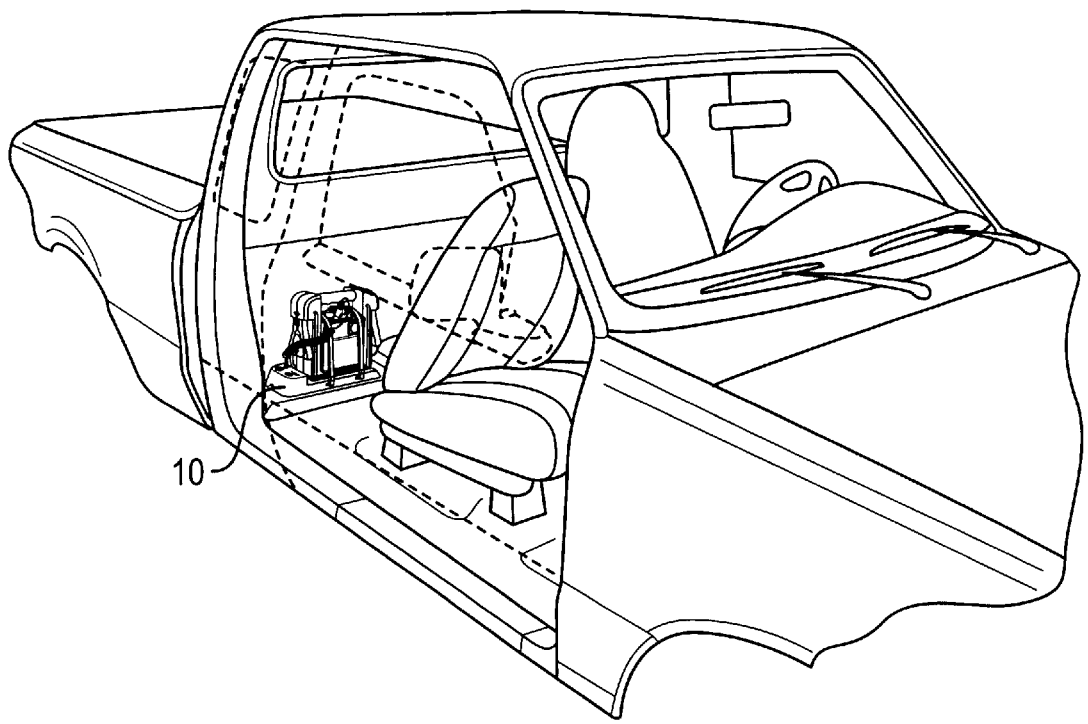
FIG. 6 is a perspective view of a pickup truck partially cutaway to show a docking station with a stowed portable electrical power source employed according to the invention.

FIG. 6 shows a perspective and cutaway partial view of a pickup truck with the docking station 10 and jump start system combination as it might be located for stowage in such a vehicle. Many variations on this arrangement are intended to come within the scope of the invention. For example, the docking station platform could have a vertical orientation and attach to a portable electrical power supply in a side by side combination. Others embodiments will be apparent to those skilled in the art.

The invention provides the advantage of a secure storage location within a moving vehicle. Moreover, the docking station will maintain the stored portable electrical power source in a high state of charge till needed.

Figure 7:
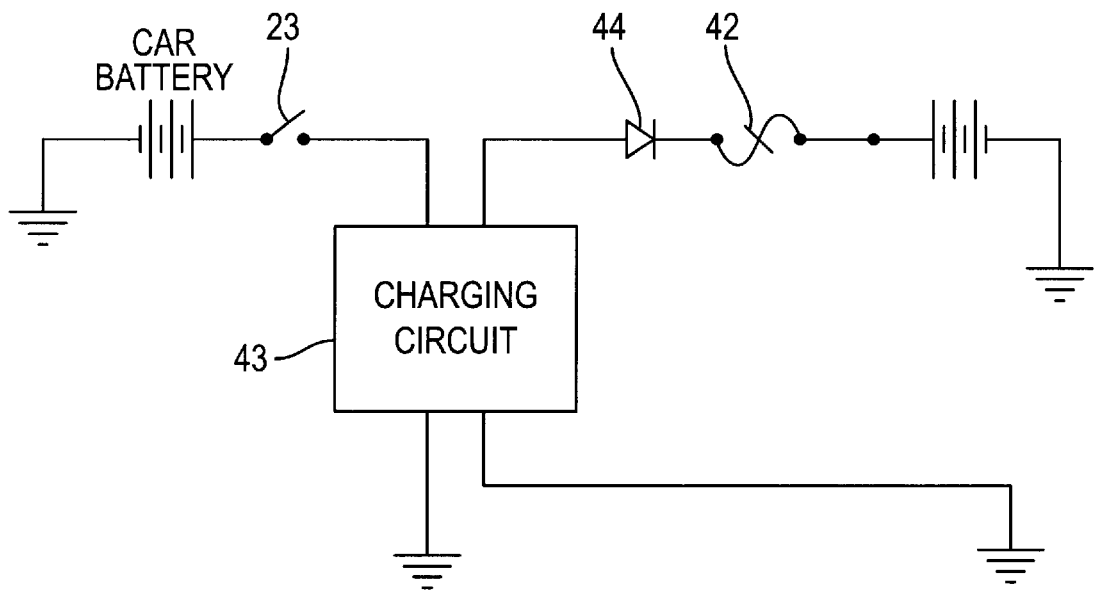
FIG. 7 is a circuit diagram of an embodiment of a battery charging circuit utilized in the invention.

FIG. 7 shows a representative portion of the electrical charging and indicating circuit electrical circuit 22. Input current is provided from the vehicle's battery or DC electrical system through manual isolation switch 23, over current protection fuse 42, and diode 44 which will prevent the stored battery from discharging in the event input voltage drops below output voltage. Charging is controlled by a charging circuit 43 of a kind well known in the art. Such a charging circuit 43 may, for example, contain a step-up transformer, and associated control circuitry.

Figure 8:
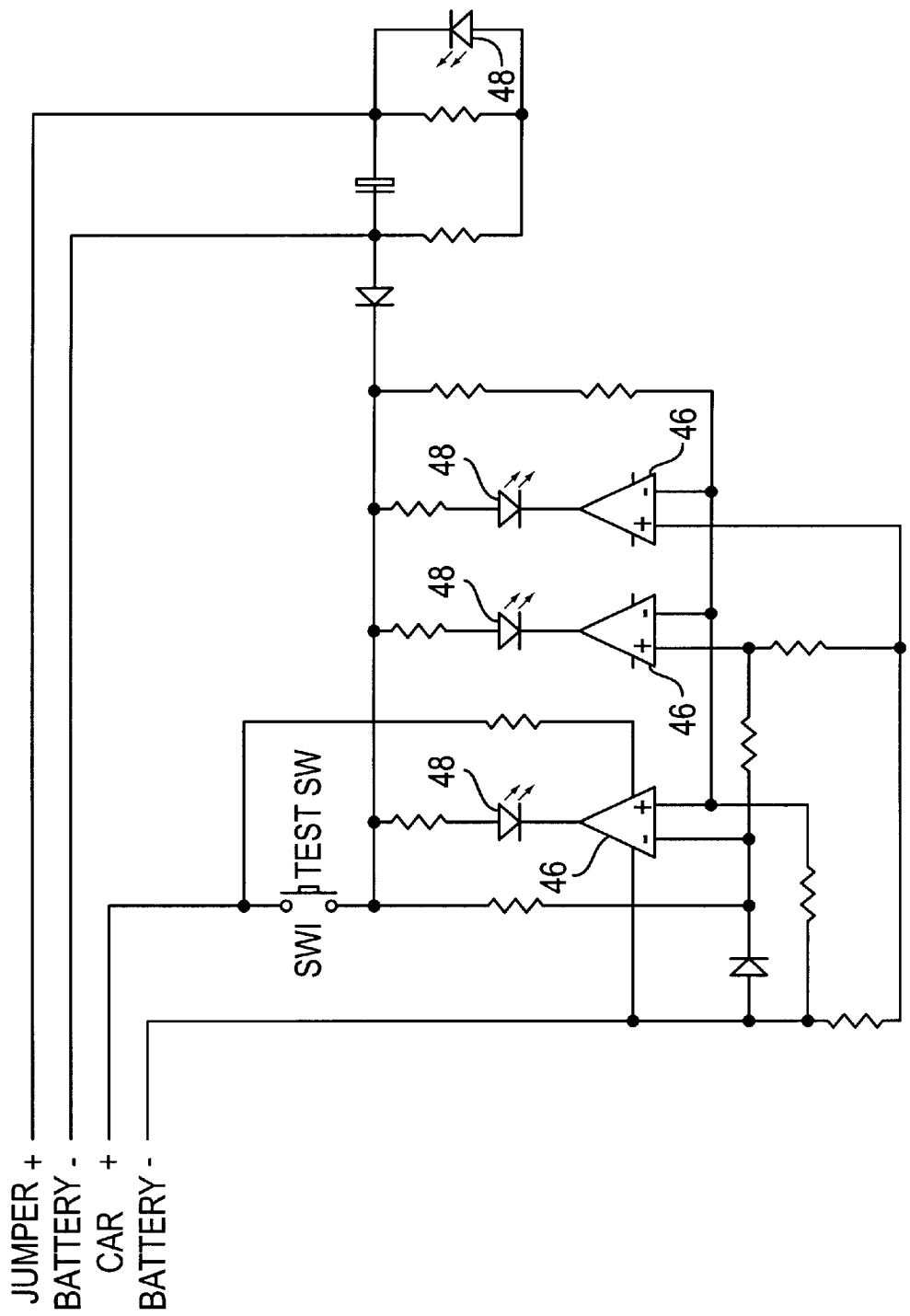
FIG. 8 is a circuit diagram of an embodiment of a battery voltage indicating circuit utilized in the invention.

FIG. 8 shows another portion of electrical charging and indicating circuit 22. A voltage sensing and indicating circuit uses a series of voltage comparator circuits 46 and related light emitting diodes (LEDs) 48 to indicate the state of charge of the stored battery. During charging, as the voltage of the stored battery rises, the comparator circuits 46 energize the LEDs 48 in sequence until, when voltage is approximately 13.0 volts, the final LED turns on to indicate that the battery of the portable electrical energy source is fully charged.

The circuits of FIGS. 7 and 8 are illustrative only. Other arrangements for isolating, charging and indicating the level of charge of the stored battery will be apparent to those skilled in the art.

The invention has been described in detail with respect to preferred embodiments, and it will now be apparent from the foregoing to those skilled in the art, that changes and modifications may be made without departing from the invention in its broader aspects, and the invention, therefore, as described in the appended claims, is intended to cover all such changes and modifications that fall within the true spirit of the invention.

What is claimed is:

1. A docking station for securing a portable electrical energy source to a vehicle having a DC power supply and for charging a battery contained in the portable electrical energy source, comprising:

a platform adapted for receiving the portable electrical energy source;

first attaching means for removably fixing the portable electrical energy source to the platform;

second attaching means for fixing the platform to a structure of the vehicle; and an electrical circuit having an input adapted for connection to the DC power supply of the vehicle, an output adapted for connection to the battery of the portable electrical energy source while the portable electrical energy source is fixed to the platform, and a circuit coupled between the input and output for controlling charging of the battery of the portable electrical energy source.

2. The docking station according to claim 1, wherein the first attaching includes a slotted receptacle on the platform for slidably receiving a corresponding and interlocking structure on an outer surface of the portable electrical energy source.

3. The docking station according to claim 2, wherein the first attaching means further includes one or more hold-down straps removably connected to the platform and adapted for applying a hold-down force to the portable electric source against the platform.

4. The docking station according to claim 1, further including an electrical charging lead having proximal and distal portions, the proximal portion of the charging lead being electrically connected to the output of the charging circuit and the distal portion including a plug for being electrically coupled to the portable electrical energy source via an electrical receptacle on the portable electrical energy source.

5. The docking station according to claim 1, wherein the platform includes a portion housing the electrical circuit.

6. The docking station according to claim 1, further including a holder arranged on the platform for stowing the plug of the electrical charging lead when not in use.

7. The docking station according to claim 1, wherein the electrical charging circuit further includes a manually operated switch mounted on an outer surface of the platform for electrically isolating the electrical charging circuit from the DC power supply.

8. The docking station according to claim 1, wherein the electrical circuit further includes a circuit portion for sensing and indicating the level of charge of the portable electrical energy source.

9. The docking station according to claim 8, wherein the circuit portion for sensing and indicating the level of charge of the portable electrical energy source further includes at least one light emitting diode visibly mounted on the platform for indicating a level of charge of the portable electrical energy source.

10. A docking station according to claim 6, wherein the holder for storing the electrical charging plug further includes a receptacle for serving as an auxilliary source of 12 volt DC power from the vehicle.

11. The docking station according to claim 1, wherein the portable electrical energy source comprises an enclosure within which the battery is disposed, and the first attaching means removably attaches the enclosure to the platform.

\* \* \* \* \*